United States Patent
Mizokoshi et al.

(10) Patent No.: US 9,890,331 B2
(45) Date of Patent: Feb. 13, 2018

(54) GASIFICATION FACILITY

(75) Inventors: Yasutaka Mizokoshi, Tokyo (JP);
Hiromi Ishii, Tokyo (JP); Takashi Iwahashi, Tokyo (JP); Katsuhiko Yokohama, Tokyo (JP); Takashi Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 689 days.

(21) Appl. No.: 13/810,550

(22) PCT Filed: Nov. 29, 2010

(86) PCT No.: PCT/JP2010/071212
§ 371 (c)(1),
(2), (4) Date: Jan. 16, 2013

(87) PCT Pub. No.: WO2012/073300
PCT Pub. Date: Jun. 7, 2012

(65) Prior Publication Data
US 2013/0112543 A1    May 9, 2013

(51) Int. Cl.
| | | |
|---|---|---|
| B01J 3/00 | (2006.01) |
| B01J 3/02 | (2006.01) |
| C10J 3/46 | (2006.01) |
| C10B 41/08 | (2006.01) |
| C10J 3/50 | (2006.01) |
| C10J 3/30 | (2006.01) |

(Continued)

(52) U.S. Cl.
CPC ............ C10B 41/08 (2013.01); B01J 3/02 (2013.01); C10J 3/30 (2013.01); C10J 3/50 (2013.01);

(Continued)

(58) Field of Classification Search
CPC .......... C10J 2300/165; C10J 2300/1653; C10J 2300/1823; C10J 2300/1606; C10J 3/50;

(Continued)

(56) References Cited

U.S. PATENT DOCUMENTS 3,698,882 A * 10/1972 Garrett et al. ............ C07C 1/00
   252/373
3,775,071 A * 11/1973 Hoffert et al. .................. 48/210
(Continued)

FOREIGN PATENT DOCUMENTS

JP    61-254695    11/1986
JP    1-278597     11/1989
(Continued)

OTHER PUBLICATIONS

Office Action dated Oct. 22, 2013 in corresponding Japanese patent application No. 2009-257771 with English translation.
(Continued)

*Primary Examiner* — Jonathan Miller
*Assistant Examiner* — Jonathan Luke Pilcher
(74) *Attorney, Agent, or Firm* — Wenderoth, Lind & Ponack, L.L.P.

(57) ABSTRACT

A gasification facility which uses flammable gas as a carrier medium for air-transporting powder fuel, used as a gasification raw material, to a gasification furnace and which can safely release the flammable gas, exhausted from a fuel feed hopper, to the atmosphere. In the gasification facility using flammable gas as a carrier medium for transporting pulverized coal as powder fuel from a pulverized coal feed hopper (7) to a gasification furnace (11), the flammable gas discharged from the pulverized coal feed hopper (7) is subjected to incineration treatment and then released to the atmosphere, so that safe release to the atmosphere can be implemented.

4 Claims, 6 Drawing Sheets

(51) Int. Cl.
*C10K 1/00* (2006.01)
*C10K 1/02* (2006.01)
*F01K 23/06* (2006.01)
*B01J 8/00* (2006.01)

(52) U.S. Cl.
CPC ............... *C10K 1/004* (2013.01); *C10K 1/02* (2013.01); *F01K 23/067* (2013.01); *B01J 3/00* (2013.01); *B01J 8/0035* (2013.01); *C10J 3/466* (2013.01); *C10J 2300/0906* (2013.01); *C10J 2300/165* (2013.01); *C10J 2300/1653* (2013.01); *C10J 2300/1675* (2013.01); *C10J 2300/1823* (2013.01); *Y02E 20/18* (2013.01)

(58) Field of Classification Search
CPC ... C10J 3/503; C10J 3/506; C10J 3/466; B01J 3/00; B01J 3/002; B01J 3/02; B01J 8/0035; F01K 23/067; C10L 349/12; C10B 49/12
USPC .................................................. 406/124, 136
See application file for complete search history.

(56) References Cited

U.S. PATENT DOCUMENTS

| | | | | |
|---|---|---|---|---|
| 4,955,989 | A * | 9/1990 | Mink | .......................... 48/197 R |
| 5,240,683 | A * | 8/1993 | Maurel | ..................... B01F 5/24 422/135 |
| 5,695,532 | A * | 12/1997 | Johnson et al. | ................. 48/203 |
| 5,851,246 | A * | 12/1998 | Bishop et al. | .................. 48/122 |
| 7,575,613 | B2 * | 8/2009 | Hobbs | .................. B01J 19/2405 110/264 |

FOREIGN PATENT DOCUMENTS

| | | |
|---|---|---|
| JP | 8-296975 | 11/1996 |
| JP | 2000-328074 | 11/2000 |
| JP | 2003-336081 | 11/2003 |
| JP | 2004-34534 | 2/2004 |
| JP | 2004-91570 | 3/2004 |
| JP | 2008-132409 | 6/2008 |
| JP | 2009-96895 | 5/2009 |
| JP | 2009-256490 | 11/2009 |

OTHER PUBLICATIONS

International Search Report dated Jan. 25, 2011 in International (PCT) Application No. PCT/JP2010/071212.
Patent Cooperation Treaty (PCT) Written Opinion of the International Searching Authority dated Jan. 25, 2011 in International (PCT) Application No. PCT/JP2010/071212.
Decision to Grant a Patent dated Jul. 29, 2014 in corresponding Japanese patent application No. 2009-257771 (with English translation).

* cited by examiner

GASIFICATION FACILITY

BACKGROUND OF THE INVENTION

1. Technical Field

The present invention is applied to a gasification facility including a furnace such as a gasification furnace for integrated coal gasification combined cycle or a coal gasification furnace for chemical process, and relates to a gasification facility which uses flammable gas as a carrier medium for a gasification raw material.

2. Description of the Related Art

Conventionally, an air-blown gasification furnace with high efficiency has been known as a gasification furnace for an integrated coal gasification combined cycle (IGCC) plant.

In the integrated coal gasification combined cycle plant shown in FIG. 6, there are shown a coal 1 as a raw material (fuel), a mill 3 for crushing coal into pulverized coal, a pulverized coal storage hopper 5, and a pulverized coal feed hopper 7. The pulverized coal as a gasification raw material is transported by nitrogen gas 9 as carrier gas (carrier medium) and is charged into an air-blown gasification furnace 11. As the carrier gas in this case, inert gas such as air may also be used in addition to the nitrogen gas 9.

Flammable gas generated in the gasification furnace 11 is supplied to a combustor of a gas turbine facility 19 through a gas cooler 13, a char recovery/recycle device 15, and a desulfurization device 17.

Offgas separated and recovered in the desulfurization device 17 is introduced to an offgas combustion furnace 21 and subjected to incineration treatment therein.

The gas turbine facility 19 drives a gas turbine generator (not shown) with gas turbine output and thereby generates power while supplying high-temperature combustion exhaust gas to a steam turbine facility 23.

The steam turbine facility 23, which includes an exhaust heat recovery boiler (not shown), recovers heat of the combustion exhaust gas supplied from the gas turbine facility 19 and heat of the combustion exhaust gas supplied from the offgas combustion furnace 21 and thereby generates steam. The steam turbine operated with the generated steam drives a steam turbine generator (not shown) to generate power.

The combustion exhaust gas used for steam generation in the steam turbine facility 23 is subjected to required treatment and then released to the atmosphere through a smokestack 25.

Since the aforementioned carrier gas in the pulverized coal feed hopper 7 is inert gas such as the nitrogen gas 9 and air, the carrier gas (exhaust gas) collected from the pulverized coal feed hopper 7 is filtered through an exhaust air bag filter 27 for dust removal and then released to the atmosphere. In this case, a plurality of the pulverized coal feed hoppers 7 are placed side by side. Each of the pulverized coal feed hoppers 7 repeats depressurization required for receiving the pulverized coal from the mill 3 under atmospheric pressure and pressurization by the carrier medium required for charging pulverized coal into the gasification furnace 11, so that continuous charge of the pulverized coal into the gasification furnace 11 can be implemented.

In a coal gasification system, a suggestion has been made to use flammable gas as carrier gas for supplying pulverized coal and char to the gasification furnace. More specifically, the carrier gas used in this case is the gas extracted from part of the flammable gas which was generated in the gasification furnace and subjected to char recovery (see, for example, Japanese Unexamined Patent Application, Publication No. 2000-328074).

SUMMARY OF THE INVENTION

1. Technical Problem

As mentioned above, when inert gas is used as carrier gas for the pulverized coal, exhaust gas of the pulverized coal feed hopper 7 can directly be released to the atmosphere through the exhaust air bag filter 27.

However, when flammable gas is used as the carrier gas for air-transporting powder fuel such as pulverized coal, it is impossible to directly release the flammable gas or exhaust gas to the atmosphere. Therefore, in the gasification facility including a fuel feed hopper such as the pulverized coal feed hopper 7, development of a technique for safely releasing flammable gas used as a carrier medium for powder fuel is desired. More specifically, in a plurality of the fuel feed hoppers, respective fuel feed hoppers perform pressurization and depressurization in turns to continuously charge powder fuel to the gasification furnace. Accordingly, it is necessary to safely treat the flammable gas or the carrier medium discharged from the fuel feed hoppers at the time of depressurization.

As compared with a gasification furnace configured to use inert gas as carrier gas for carrying pulverized coal, the gasification furnace configured to use flammable gas is said to be advantageous in enhancement of efficiency since the gasification furnace is free from inert gas that is a hindrance factor of gasification, though this has not yet been proved so far.

The present invention has been made in view of the above situations, and an object of the present invention is to provide a gasification facility capable of safely releasing flammable gas, which was used as a carrier medium and discharged from a fuel feed hopper, to the atmosphere in the case of air-transporting powder fuel, such as pulverized coal used as a gasification raw material, to a gasification furnace.

2. Solution to the Problem

In order to solve the aforementioned problems, the present invention has employed following solutions.

A gasification facility according to the present invention is a gasification facility wherein flammable gas is used as a carrier medium for transporting powder fuel from a fuel feed hopper to a gasification furnace, and the flammable gas discharged from the fuel feed hopper is subjected to incineration treatment and is then released to an atmosphere.

According to such a gasification facility of the present invention, the flammable gas discharged from the fuel feed hopper is subjected to incineration treatment and then released to the atmosphere, so that safe release to the atmosphere can be implemented.

In the above-stated invention, it is desirable that the incineration treatment is performed in an offgas combustion furnace placed downstream from the gasification furnace, in a flare stack placed downstream from the gasification furnace, or in a gas turbine combustor placed downstream from the gasification furnace.

In the above-stated invention, it is desirable that part of flammable gas generated in the gasification furnace is introduced and used as the flammable gas.

3. Advantageous Effects of the Invention

In the above-described present invention, flammable gas efficient in gasification is used as a carrier medium for transporting powder fuel to the gasification furnace, and the used flammable gas discharged from the fuel feed hopper is subjected to incineration treatment and safely released to the atmosphere. As a result, it becomes possible to produce a remarkable effect of ensuring safety and enhancing efficiency of the gasification facility.

DETAILED DESCRIPTION OF THE INVENTION

Hereinafter, one embodiment of a gasification facility according to the present invention will be described with reference to the drawings. In the following embodiment, a description will be given of a configuration example applied to a gasification facility including a gasification furnace for an integrated coal gasification combined cycle plant. It should naturally be understood that the present invention is not limited thereto but is also applicable to a gasification facility including a gasification furnace, such as coal gasification furnaces for chemical process, which performs gasification with pulverized coal and other powder as a raw material (fuel).

Examples of other powder fuel include biomass, and also include powder fuel obtained by mixing two or more kinds of powder, that is, pulverized coal and biomass for example.

First Embodiment

Figure 1:
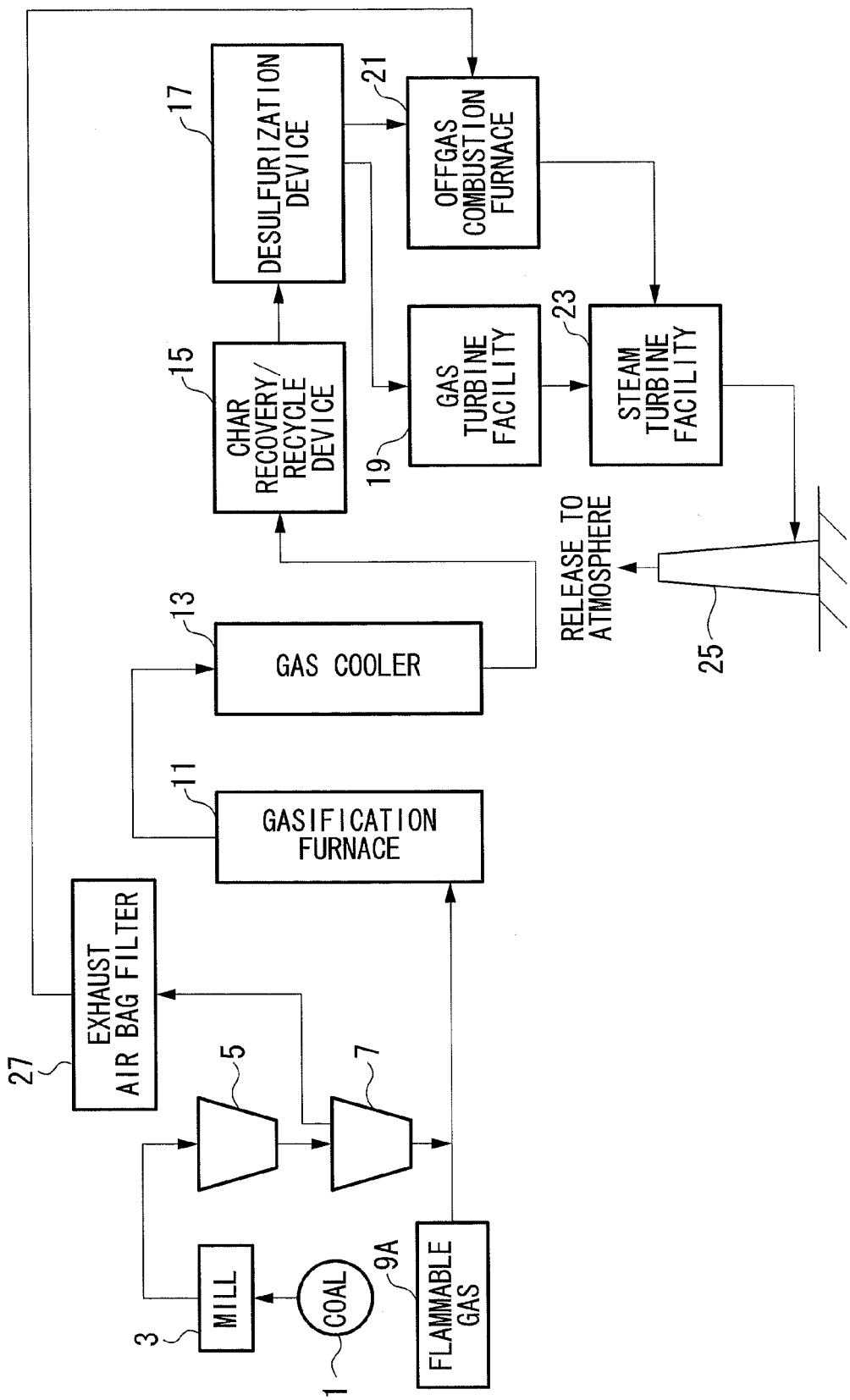
FIG. 1 is a systematic diagram showing a first embodiment (in steady operation) as a configuration example of a gasification facility according to the present invention.
Figure 4:
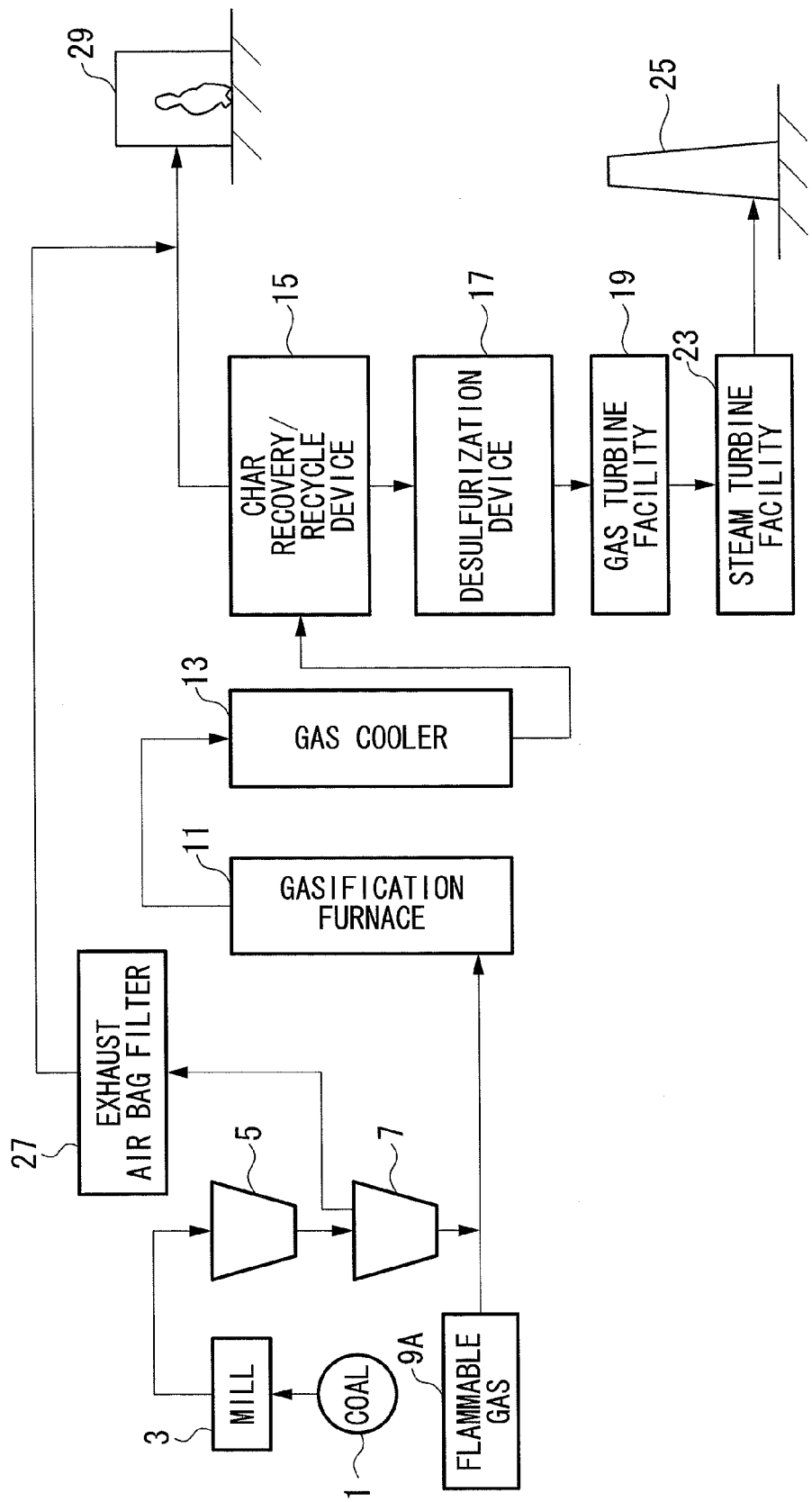
FIG. 4 is a systematic diagram showing a second embodiment (in start-up operation) as a configuration example of a fuel feed hopper according to the present invention.

In an integrated coal gasification combined cycle plant, flammable gas resulting from gasification of pulverized coal is used in the gas turbine facility 19 as fuel for a gas turbine combustor (not shown), and gas turbine output is used to drive a gas turbine generator (not shown) for generating power, while exhaust heat of combustion exhaust gas discharged from the gas turbine facility 19 and the like is used to generate steam in the steam turbine facility 23, and the steam is used to drive a steam turbine (not shown) and a steam-turbine generator (not shown) for generating power. The gasification facility in the embodiment shown in FIG. 1 is a component member of the integrated coal gasification combined cycle plant. The systematic diagram of FIG. 1 shows principal component members for use in steady operation. Principal component members for use in start-up operation are shown in FIG. 4 described later.

Coal 1 used as a gasification raw material is charged into the mill 3 serving as a coal pulverizer and is crushed therein into pulverized coal of desired fineness, which is temporarily stored in the pulverized coal storage hopper 5. Then, a required amount of the pulverized coal, which is to be gasified in the gasification furnace 11, is fed to the air-blown gasification furnace 11, with flammable gas 9A as carrier gas (carrier medium), via a fuel feed hopper or the pulverized coal feed hopper 7.

The pulverized coal feed hopper 7 in this case needs to receive pulverized coal from the mill 3 under atmospheric pressure and to charge the pulverized coal into the gasification furnace 11 whose internal pressure is higher than the atmospheric pressure. Therefore, in the pulverized coal feed hopper 7, pressurization and depressurization are performed in the range from atmospheric pressure at the time of accepting the pulverized coal to pressure "Pg+α" at the time of charging, where Pg represents the pressure in the gasification furnace 11. More specifically, a plurality of pulverized coal supply systems including the pulverized coal feed hoppers 7 are provided, and the pulverized coal feed hoppers 7 to be charged with pulverized coal are switched one by one so that the pulverized coal is continuously charged into the gasification furnace 11. The carrier gas in this case is not particularly limited to a specific type of flammable gas or to a particular supply source thereof. For example, part of the flammable gas which is generated in the gasification furnace 11 and introduced from a proper position on the downstream side of the gasification furnace 11 may be used as the carrier gas.

The pulverized coal charged into the gasification furnace 11 is converted into flammable gas (coal gas) having carbon monoxide and hydrogen as principal components by partial oxidation. However, gasification products which flow out of the gasification furnace 11 include not only flammable gas but also such components as char (unburned component) and sulfur. Accordingly, these gasification products are cooled by passing through the gas cooler 13, and then pass through the char recovery/recycle device 15 and the desulfurization device 17, by which the components such as char and sulfur are separated and removed.

Thus-refined flammable gas is supplied to the gas turbine facility 19 as fuel, while the separated and recovered char is returned to the gasification furnace 11 and re-gasified. Offgas separated in the desulfurization device 17 is supplied to an offgas combustion furnace 21 and incinerated therein.

In the gas turbine facility 19, flammable gas is combusted in a gas turbine combustor to generate high-temperature/high-pressure combustion gas, and rotors of the gas turbine are rotated with energy retained in the combustion gas. Thus-generated gas turbine output is used as a driving source of a gas turbine generator, and thereby first phase power generation is conducted by the gas turbine generator.

The combustion gas used for rotating the rotors of the gas turbine is supplied to the steam turbine facility 23 as high-temperature combustion exhaust gas.

The high-temperature combustion exhaust gas supplied to the steam turbine facility 23 is used as a heating source of an exhaust heat recovery boiler (not shown). Since high-temperature combustion exhaust gas is also discharged from the offgas combustion furnace 21, this combustion exhaust gas is also supplied to the steam turbine facility 23 and used therein as a heating source of the exhaust heat recovery boiler.

The exhaust heat recovery boiler generates steam when heated by the high-temperature combustion exhaust gas. The energy retained in the steam rotates the rotors of the steam turbine, and thus-generated output of the steam turbine is used as a driving source of the steam-turbine generator. Since second phase power generation is thus conducted by the steam-turbine generator, highly efficient power generation can be implemented.

The combustion exhaust gas used for steam generation in the steam turbine facility 23 is subjected to required treatment heretofore known and then released to the atmosphere through the smokestack 25.

In this embodiment, the flammable gas 9A is used as the aforementioned carrier gas which transports pulverized coal from the pulverized coal feed hopper 7 to the gasification furnace 11. Consequently, exhaust generated in the pulverized coal feed hopper 7, i.e., part of the flammable gas 9A fed as a carrier medium, is discharged in the process of depressurization, which is performed when a pulverized coal charging step is shifted to a pulverized coal receiving step. The exhaust is filtered through the exhaust air bag filter 27 for removal of a particulate component and the like, and then supplied to the offgas combustion furnace 21. Therefore, the flammable gas collected from the pulverized coal feed hopper 7 as exhaust is subjected to incineration treatment, together with the offgas supplied from the desulfurization device 17, in the offgas combustion furnace 21, and resulting exhaust heat can effectively be used for steam generation in the steam turbine facility 23.

More specifically, in the gasification facility of this embodiment, the flammable gas which was used as carrier gas for the pulverized coal and collected as exhaust gas of the pulverized coal feed hopper 7 is sent to the offgas combustion furnace 21 which serves as a discharge destination of the exhaust of the pulverized coal feed hopper 7. Combustion exhaust gas resulting from the incineration treatment therein is released to the atmosphere through the smokestack 25 via a system of the steam turbine facility 23.

Since the flammable gas used as carrier gas is subjected to the incineration treatment in the offgas combustion furnace 21, it becomes possible to safely release the flammable gas to the atmosphere through the smokestack 25. Furthermore, when high-temperature combustion exhaust gas discharged in the process of the incineration treatment is released to the atmosphere, it is released via the steam turbine facility 23 so as to be used for steam generation. Therefore, the amount of heat (calorie) retained in the flammable gas is recovered, which makes it possible to enhance thermal efficiency in the gasification facility and the integrated coal gasification combined cycle plant.

In the foregoing embodiment, the type and the supply source of the flammable gas for use as a carrier medium are not specified. However, in a first modification shown in FIG. 2 and a second modification shown in FIG. 3, part of the flammable gas generated in the gasification furnace 11 is introduced and used as a carrier medium. In the configuration examples of FIGS. 2 and 3, component members identical to those in FIG. 1 are designated by identical reference signs to omit detailed description.

More specifically, gasification facilities in the first modification and the second modification are different from the gasification facility of the first embodiment only in the configuration concerning the supply source of flammable gas. Therefore, flammable gases 9B and 9C used as carrier media for the pulverized coal can safely be released to the atmosphere through the smokestack 25 after going through the same process as that in the embodiment described above.

Figure 2:
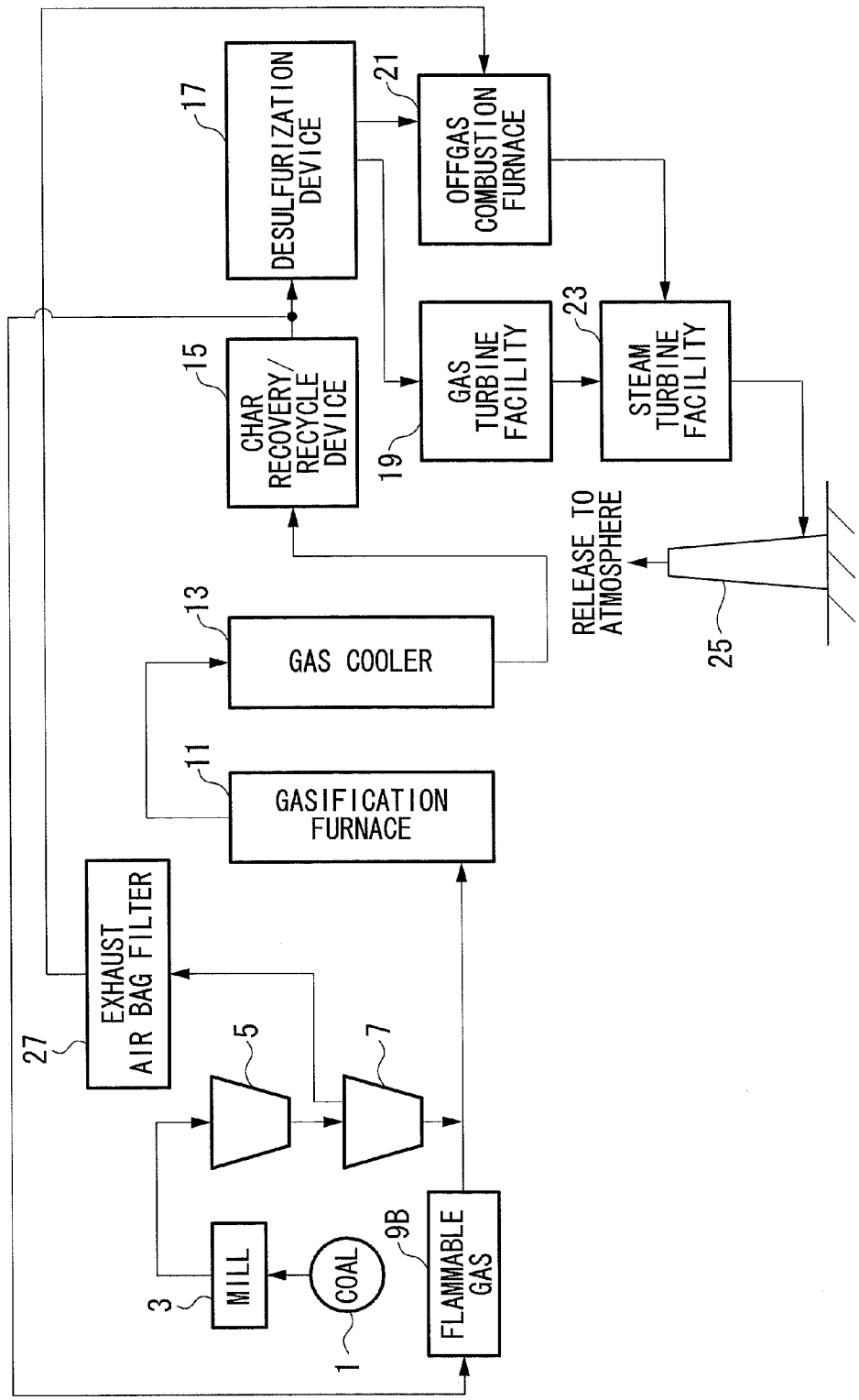
FIG. 2 is a systematic diagram showing a first modification of the gasification facility according to the embodiment of FIG. 1.

In the first modification shown in FIG. 2, part of the flammable gas introduced from the downstream side of the char recovery/recycle device 15 is used as a carrier medium or the flammable gas 9B. As a consequence, the flammable gas 9B contains a sulfur component as it is not desulfurized, and its gas temperature is as high as, for example, about 300 C.

Figure 3:
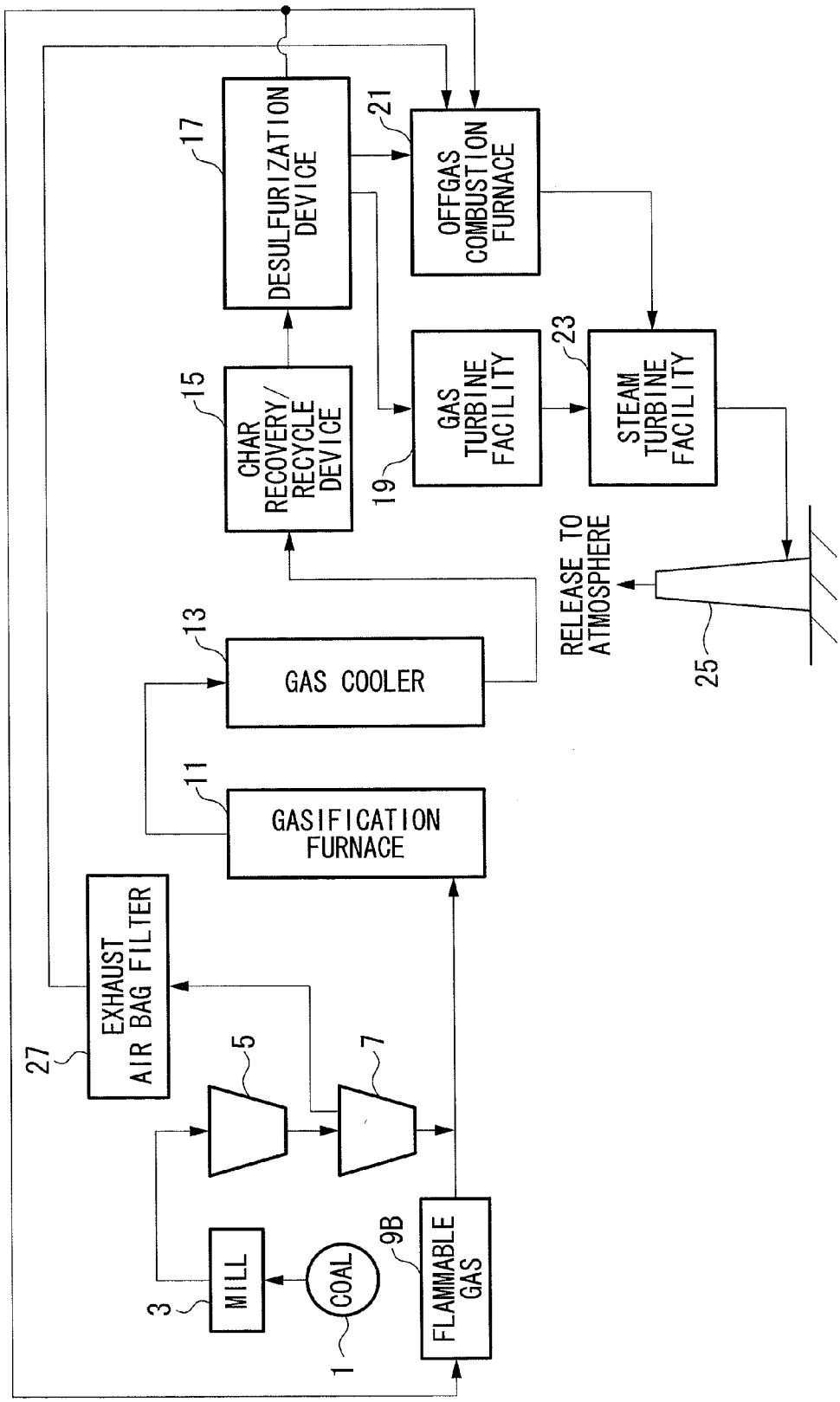
FIG. 3 is a systematic diagram showing a second modification of the gasification facility according to the embodiment of FIG. 1.

In the second modification shown in FIG. 3, part of the flammable gas introduced from the downstream side of the desulfurization device 17 is used as a carrier medium or the flammable gas 9C. As a consequence, the flammable gas 9C is desulfurized flammable gas without a sulfur component. Moreover, since the temperature thereof declines in the process of desulfurization treatment, its gas temperature is as relatively low as, for example, about 200 C. Therefore, in comparison with the flammable gas 9B of the first modification, the low-temperature flammable gas 9C is preferable as a carrier medium for the pulverized coal which has a risk of spontaneous ignition. Since the flammable gas 9C as a carrier medium is charged into the gasification furnace 11 together with pulverized coal, the flammable gas having a less sulfur content is advantageous in after-treatment and the like.

Second Embodiment

Now, a second embodiment of the gasification facility according to the present invention, which is applied to the gasification furnace in start-up operation, will be described with reference to FIG. 4. Component members identical to those in the foregoing embodiment and its modifications are designated with identical reference signs to omit detailed description.

In this embodiment, flammable gas is also used as carrier gas for pulverized coal in start-up operation of the gasification furnace where gas generation of the gasification furnace 11 is unstable. In this case, the discharge destination of the flammable gas recovered as exhaust gas of the pulverized coal feed hopper 7, that is, the discharge destination of exhaust of the pulverized coal feed hopper 7, are changed from the offgas combustion furnace 21 in the foregoing embodiment to a flare stack 29.

Also in this gasification facility, the flammable gas generated in the gasification furnace 11 is cooled in the gas cooler 13, and then char therein is recovered in the char recovery/recycle device 15. However, since a composition and a gas content of the flammable gas generated in the gasification furnace 11 during startup operation are unstable, there are many obstacles in using the flammable gas as fuel for the gas turbine facility 19. Accordingly, the flammable gas after char recovery is introduced to the flare stack 29 and subjected to incineration treatment therein until the gasification furnace 11 enters into steady operation and gas generation is stabilized.

Therefore, the flammable gas emitted from the pulverized coal feed hopper 7 as exhaust is also filtered through the exhaust air bag filter 27 for removal of particulate components and the like, and then introduced to the flare stack 29, where incineration treatment is applied to the flammable gas together with excess gas.

As a result, in the start-up operation of the gasification facility, the flammable gas as a carrier medium in the pulverized coal feed hopper 7 is discharged to a grand flare system. Therefore, also in the start-up operation of the gasification facility where the offgas combustion furnace 21 is not operated, incineration treatment of the flammable gas can be performed in a grand flare 29, so that the flammable gas can safely be released to the atmosphere.

In this embodiment, as in the foregoing first modification and the second modification, part of the flammable gas may be introduced from the downstream side of the char recovery/recycle device 15 or the desulfurization device 17 so as to be used as carrier media or the flammable gases 9B and 9C.

Third Embodiment

Figure 5:
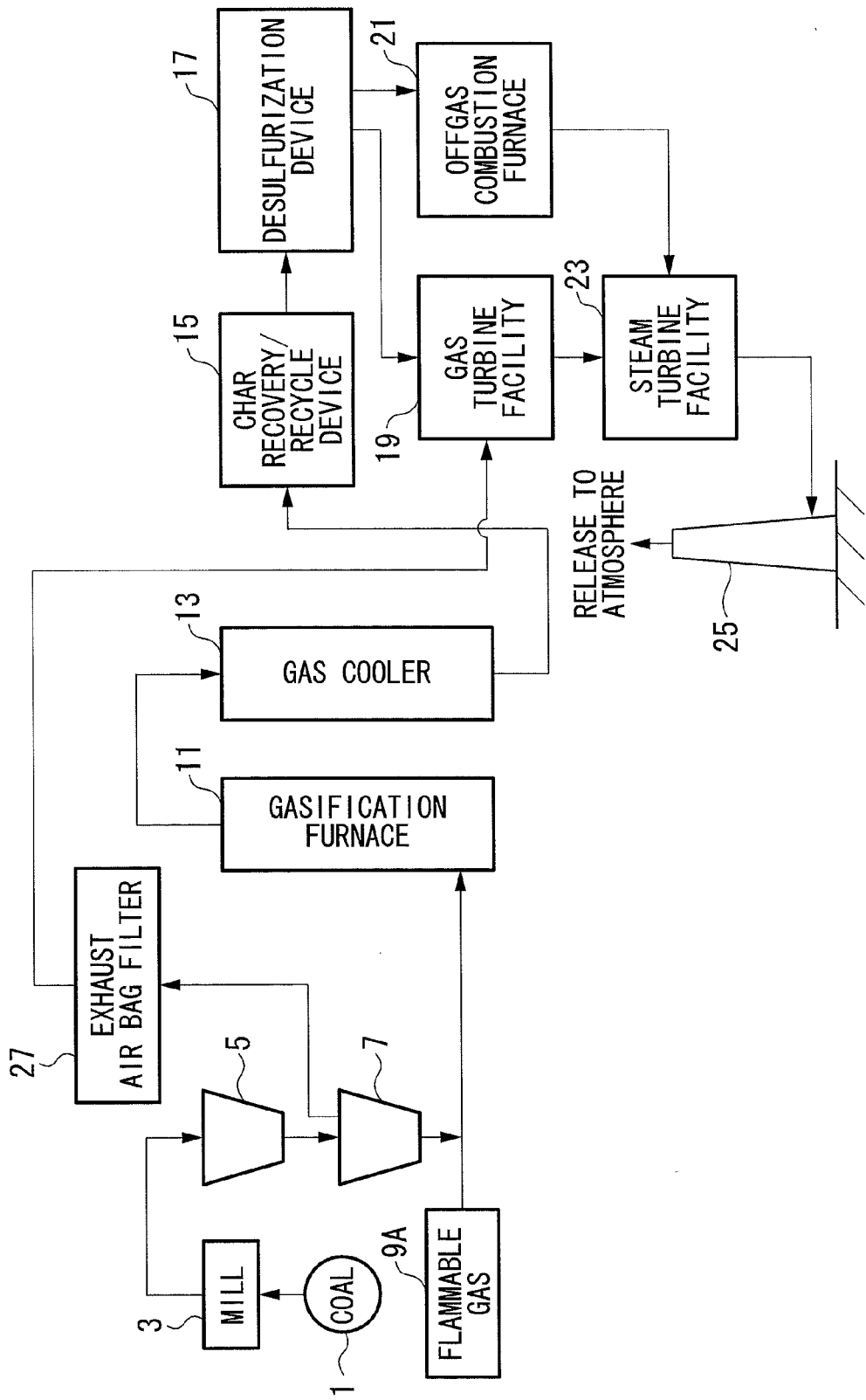
FIG. 5 is a systematic diagram showing a third embodiment (in steady operation) as a configuration example of a fuel feed hopper according to the present invention.
Figure 6:
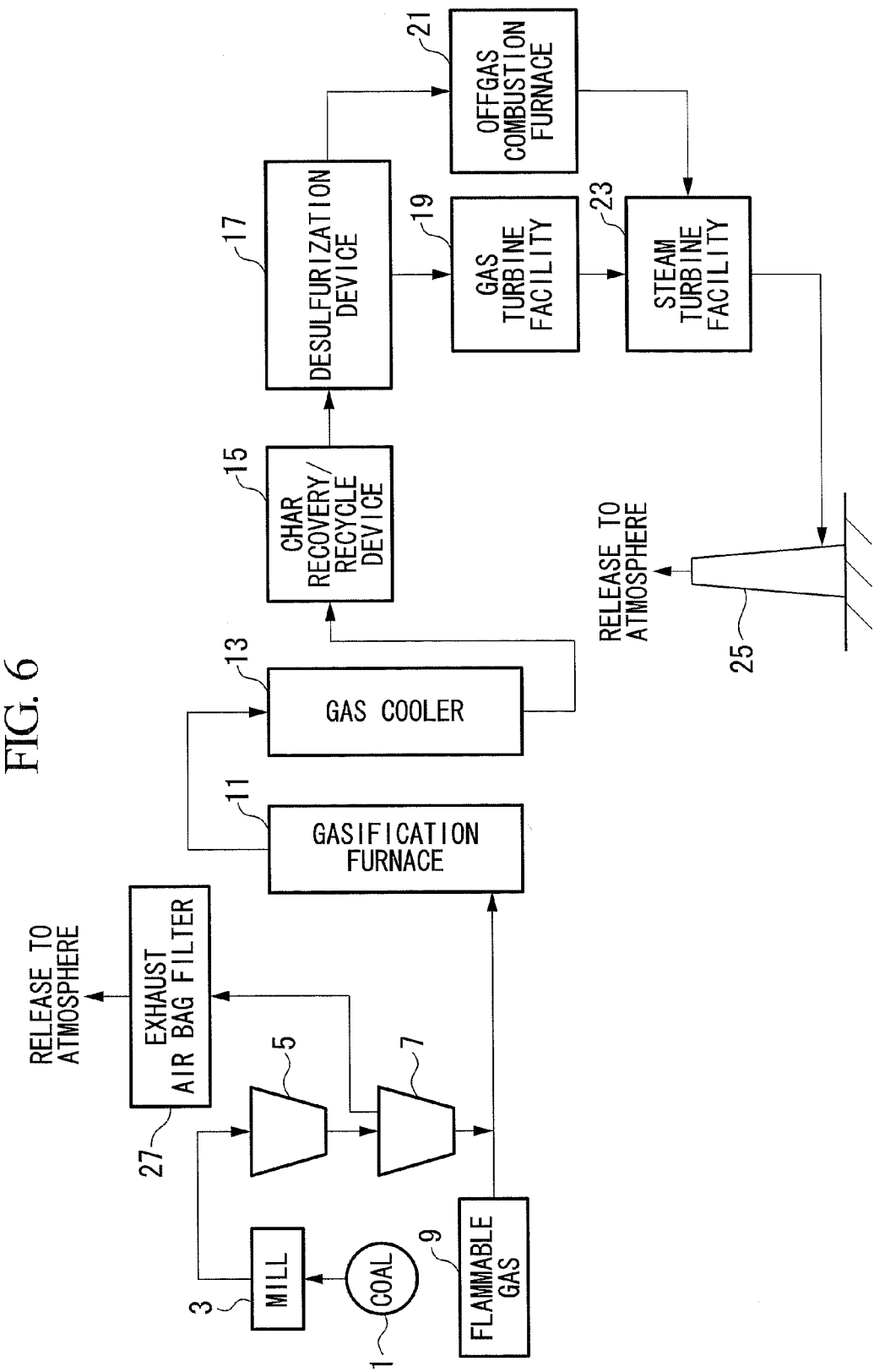
FIG. 6 is a systematic diagram showing a configuration example according to a conventional gasification facility.

Now, a third embodiment of the gasification facility according to the present invention will be described with reference to FIG. 5. Component members identical to those in the foregoing embodiments and their modifications are designated with identical reference signs to omit detailed description.

In this embodiment, the discharge destination of the flammable gas which was used as carrier gas for pulverized coal and recovered as exhaust gas of the pulverized coal feed hopper 7, i.e., the discharge destination of exhaust of the pulverized coal feed hopper 7, is changed from the offgas combustion furnace 21 or the flare stack 29 in the foregoing embodiments to the gas turbine facility 19.

More specifically, flammable gas which was generated in the gasification furnace 11 and desulfurized thereafter as well as flammable gas as exhaust of the pulverized coal feed hopper 7 are used as fuel to be combusted in a gas turbine combustor (not shown) of the gas turbine facility 19. Therefore, the flammable gas emitted from the pulverized coal feed hopper 7 as exhaust is filtered through the exhaust air bag filter 27 for removal of particulate components and the like, and then subjected to incineration treatment in the gas turbine combustor together with main fuel or the flammable gas desulfurized by going through the desulfurization device 17.

As a result, the flammable gas as a carrier medium in the pulverized coal feed hopper 7 is discharged to the gas turbine facility 19. Therefore, it becomes possible to perform incineration treatment on the flammable gas in the gas turbine combustor and to safely release the flammable gas to the atmosphere through the smokestack 25. In this case, since the combustion exhaust gas discharged from the gas turbine facility 19 is subjected to required treatment heretofore known and then released to the atmosphere, it does not particularly cause problems.

In this embodiment, as in the foregoing first modification and the second modification according to the first embodiment, part of the flammable gas may be introduced from the downstream side of the char recovery/recycle device 15 or the desulfurization device 17 so as to be used as carrier media or the flammable gases 9B and 9C.

Thus, according to the gasification facility in each of the aforementioned embodiments and modifications, the flammable gas used as a carrier medium, which transports pulverized coal (powder fuel) used as a gasification raw material to the gasification furnace 11, is subjected to incineration treatment performed in the offgas combustion furnace 21, the flare stack 29 or the gas turbine facility 19. Therefore, gasification efficiency is enhanced while used flammable gas can safely be released to the atmosphere.

It should be understood that the present invention is not limited to the embodiments disclosed and appropriate modifications may be made without departing from the scope of the present invention, such as the powder fuel not limited to pulverized coal for example.

REFERENCE SIGNS LIST

1 Coal (gasification raw material)
3 Mill (coal pulverizer)
5 Pulverized coal storage hopper
7 Pulverized coal feed hopper (fuel feed hopper)
9 Nitrogen gas (carrier medium)
9A-9C Flammable gas (carrier medium)
11 Gasification furnace
13 Gas cooler
15 Char recovery/recycle device
17 Desulfurization device
19 Gas turbine facility
21 Offgas combustion furnace
23 Steam turbine facility
25 Smokestack
27 Exhaust air bag filter
29 Flare stack

The invention claimed is:

1. A gasification system comprising:
a gasification furnace;
at least two pulverized coal supply systems connected to the gasification furnace via a carrier pipe, each of the pulverized coal supply systems includes one pulverized coal feed pressure hopper which is directly connected to the carrier pipe and a pulverized coal atmospheric-pressure storage hopper provided on an upper portion of the pulverized coal feed hopper;
an exhaust air bag filter connected from the pulverized coal feed pressure hoppers via a first exhaust line;
an atmospheric-pressure incineration device connected from the exhaust air bag filter via a second exhaust line;
a gas cooler, a char recovery/recycle device, and a desulfurization device connected to a downstream side of the gasification furnace in a gas flow direction; and
a gas turbine facility which is connected to a downstream side of the desulfurization device and which combusts a flammable gas generated in and supplied from the gasification furnace,
wherein a part of the flammable gas, which is generated in the gasification furnace, is supplied to the carrier pipe and used as a carrier medium,
wherein each of the at least two pulverized coal supply systems is configured to transport pulverized coal by the part of the flammable gas, which is used as the carrier medium flowing in the carrier pipe from the pulverized coal feed pressure hopper to the gasification furnace,
wherein each of the pulverized coal feed pressure hoppers is configured to repeat depressurization required for receiving the pulverized coal from a mill under atmospheric pressure via the pulverized coal atmospheric-pressure storage hopper, and pressurization by the part of the flammable gas used as the carrier medium for charging pulverized coal into the gasification furnace,
wherein the at least two pulverized coal supply systems are configured to charge the pulverized coal continuously into the gasification furnace by switching to one of the filled and pressurized pulverized coal feed pressure hoppers,
wherein the flammable gas, which is discharged from the pulverized coal feed pressure hoppers, is discharged as exhaust through the exhaust air bag filter via the first exhaust line in a process of depressurization to atmospheric pressure which is performed when a step of charging pulverized coal to the gasification furnace is shifted to a step of receiving pulverized coal in one of the pulverized coal feed pressure hoppers, and is introduced into the atmospheric-pressure incineration device via the second exhaust line, and wherein the atmospheric-pressure incineration device incinerates the exhaust which is the part of the flammable gas discharged from the pulverized coal feed hoppers through the exhaust air bag filter and then the incinerated exhaust is released to the atmosphere.

2. The gasification system according to claim 1, wherein the incineration device is an off gas combustion furnace placed downstream from the desulfurization device.

3. The gasification system according to claim 1, wherein the incineration device is a flare stack placed downstream from the gasification furnace.

4. The gasification system according to claim 1, wherein the incineration device is a gas turbine combustor placed downstream from the gasification furnace.

\* \* \* \* \*